UNITED STATES PATENT OFFICE.

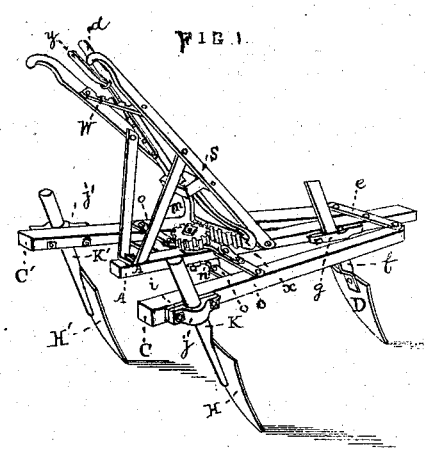
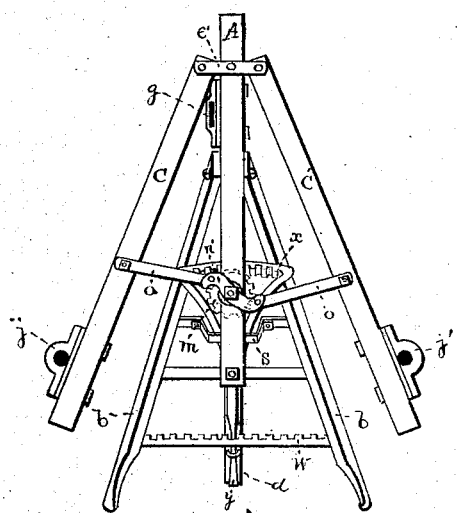
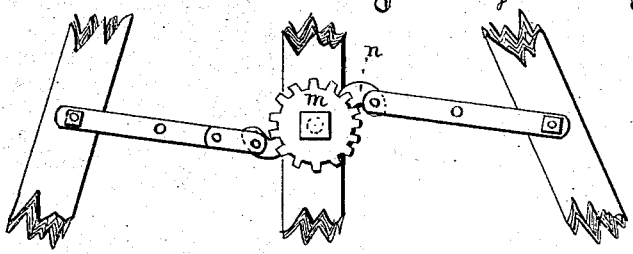
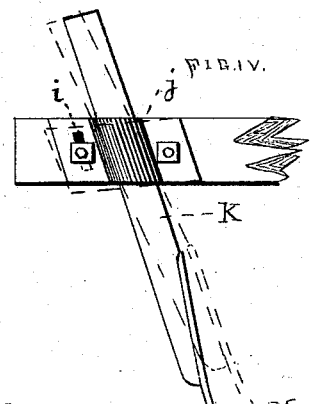

JOHN O. MILNE, OF MINNEAPOLIS, MINNESOTA.

IMPROVEMENT IN CULTIVATORS.

Specification forming part of Letters Patent No. 159,523, dated February 9, 1875; application filed November 7, 1874.

*To all whom it may concern:*

Be it known that I, JOHN O. MILNE, of Minneapolis, in the county of Hennepin and State of Minnesota, have invented certain new and useful Improvements in Cultivators, of which the following is a specification:

My invention consists in certain new improvements in the construction and arrangement of parts in walking cultivators or three-shovel plows; and has for its object to furnish a cultivator possessing the qualities of strength and durability, and a more perfect system of adjustments than has been secured in any cultivator of this class.

In the drawings, Figure 1 is a perspective view, Fig. 2 is an inverted plan view of the beams and their connections; and Figs. 3 and 4 are detail views of my invention.

The same letters of reference indicate identical parts.

A, Fig. 2, is a beam, to which is attached the handles $b\ b'$. The beams C C' are hinged at one end to the beam A by means of bolts and the bars $e\ e'$, the opposite or rear ends of the beams C C' having a lateral movement operated and controlled by the lever $d$, as will be more fully explained. The shovel D is provided with a flat shank, $f$, and is secured to the beam A by bolts and the adjustable socket $g$. This form of shank and socket admits of vertical adjustment. The shovel D (shown in Fig. 1) is concave at the point and convex the greater part of its length. This form of the point tends to lift the soil, and the convex portion to divide it, and with less power than is required with a straight or double concave blade. The shovels H H' have round shanks $k\ k'$, and are attached to the rear ends of the beams C C' by the sockets $j\ j'$. The sockets $g\ j\ j'$ are each held in position by two bolts, one of which passes through the slot $i$. The end containing the slot can be moved up or down, and the shovels thereby moved forward or back, and set at any desired angle to the beam by tightening the bolts that hold the socket in position. The shanks $k\ k'$ being round and of uniform diameter, the shovels H H' can be adjusted vertically, and by turning the shanks in their sockets the shovels may be set to throw the soil toward or from the center, or at any angle to the line of resistance. The lateral movements of the beams C C' are effected by means of the lever $d$, gear-wheel $m$, curved levers $n\ n'$, and connecting-bars $o\ o$. The relation of these several parts is shown in Fig. 3. The lever $d$ is pivoted to the bar $s$, and in such position that the segment of gear $x$ engages in the gear $m$. W is a brace for the handles $b\ b'$, one edge of which is notched for retaining the catch $y$ attached to the lever $d$.

It is evident that, by moving the lever $d$ to the right or left, the gear $m$ will make a part of a revolution, and the levers $n\ n'$, being retained in a permanent relation to the gear $m$, by means of a square bolt, which passes through square holes in the levers and gear, will be thrown parallel with, or at right angles to, the beam A, and through the connecting-bars $o\ o\ o\ o$ the movement is transmitted to the beams C C', and the shovels H H' are thrown from or toward the center of the cultivator. This device for regulating the lateral movement of the beams C C' enables the operator to adjust the width of the cultivator at will, and to correspond with the varying distances between rows, and to more easily pass obstructions. The shovels being somewhat below the beams are not liable to clog with weeds or grass. The power should be applied by any suitable means to the front end of the beam A.

What I claim is—

In combination with the hinged beams C C' the lever $d$, having toothed segment $x$, gear-wheel $m$, levers $n\ n'$, and connecting-bars $o\ o$, as described, and for the purpose specified.

In testimony that I claim the foregoing I have hereunto set my hand and seal.

JOHN O. MILNE. [L. S.]

Witnesses:
E. E. DICKERSON,
C. J. WEST.